United States Patent Office 3,366,454
Patented Jan. 30, 1968

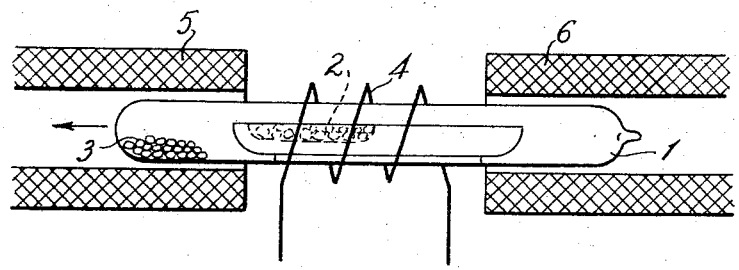

3,366,454
METHOD FOR THE PRODUCTION AND REMELTING OF COMPOUNDS AND ALLOYS
Otto Gerd Folberth, Boblingen, and Rolf Gremmelmaier, Erlangen, Germany, assignors to Siemens-Schuckertwerke Aktiengesellschaft, Berlin - Siemensstadt, Germany, a German corporation
Continuation of application Ser. No. 534,852, Sept. 16, 1955. This application Mar. 8, 1965, Ser. No. 437,897
Claims priority, application Germany, Sept. 18, 1954, S 40,885; Mar. 10, 1955, S 42,999
The portion of the term of the patent subsequent to July 12, 1977, has been disclaimed
4 Claims. (Cl. 23—204)

Our invention relates to the production of chemical compounds or alloys by melting the components together and subsequently permitting the melt to cool and solidify. The present invention is a modification of the process described in copending U.S. application Ser. No. 456,-249, filed Oct. 12, 1954, and is herein disclosed as a continuation of our application Ser. No. 534,852, filed Sept. 16, 1955, now abandoned.

We hereby disclaim the terminal part—subsequent to July 12, 1977—of the term of the patent desired to be granted, so as to make such patent terminate together with U.S. Patent No. 2,944,975 of O. G. Folberth, issued July 12, 1960.

For the production of compounds or alloys which, at the melting temperature and in the state of equilibrium, have a vaporous phase whose composition differs essentially from the composition of the melt, the so-called "Faraday method" has been found useful, particularly in cases where the vaporous phase at the melting temperature consists essentially only of a comparatively low boiling, that is, more highly volatile component element.

According to the Faraday method only the less volatile component is placed into the melting vessel proper, for instance into the crucible or boat, whereas the more highly volatile component is located at another place of the sealed enclosure preferably so that it is fused to the bottom of the enclosure. The heating of the enclosure, for instance a sealed ampule, is effected in such a manner that at least the crucible itself reaches the required melting temperature. Care is taken that the other portions of the ampule are heated at least to such a temperature that the vapor pressure of the more highly volatile component element is equal to the partial vapor pressure of this component above the desired compound at the melting point of the compound. For instance, in making gallium phosphide the pressure of the phosphorus vapor generated by vaporizing the phosphorus body, in the zone of lower temperature, is initially greater than the equilibrium partial pressure of phosphorus above the resulting gallium phosphide melt. The higher the phosphorus pressure resulting from the evaporation of the phosphorus body, the more rapidly will the state of equilibrium be reached. While the ampule is being kept at the proper temperature, the melt enriches itself with the said more highly volatile component element, from the vapor phase, until the vapor pressure of this component above the melt is equal to the vapor pressure above the body of the material of higher volatility on the bottom of the ampule. In this manner, with a suitable choice of the temperature program, a predetermined composition of the melt or of the subsequently solidified compound in crystalline form is obtained.

The above-described Faraday method has the following disadvantages:

(1) Due to the fact that the vapor pressure above the body of higher volatility material is an exponential function of the temperature of the coldest spot of the enclosed system, an accurate production of a desired compound or alloy is achieved only when this minimum temperature can be maintained with very great accuracy during the entire melting operation. If, for instance, the minimum temperature is too low, the vapor pressure is also too low and the melt dissolves too little of the more volatile component so that the melt and hence the resulting compound or alloy is not given the desired composition. On the other hand, when the minimum temperature is too high, though only during short intervals of time, then the vapor pressure, due to the mentioned exponential relation, can reach such values that there is a danger of explosion.

(2) If the component of higher volatility is an element that is polymorphous just within the temperature range required, and if, besides, this element has a complicated kinetic law of conversion, as is the case for instance with phosphorus, then it may be impossible or extremely difficult to maintain in the above-described manner a predetermined accurate vapor pressure within the ampule. This applies to phosphorus at temperatures between approximately 200° C. and 600° C.

It is an object of our invention to improve the Faraday method so as to eliminate the above-mentioned disadvantages.

More particularly, relating to the production of a compound or alloy in crystalline form by melting the components together within an enclosed system, it is an object of the invention to facilitate the production or processing of compounds or alloys which have at least one component whose partial vapor pressure above the melt, in equilibrium condition, is appreciably higher than the partial vapor pressure of the other component and also appreciably higher than the partial pressure of a gaseous compound of these two components. For example, when operating with a melt of gallium phosphide, the gas space actually contains a slight quantity of gaseous gallium phosphide at a vapor pressure which is approximately equal to that of gallium and thus is considerably smaller than the vapor pressure of the phosphorus.

More specifically and according to another feature of the invention, the weighed quantities and the temperature program are so chosen that on the one hand the melt can receive the desired proportion of the more highly volatile component or components and that on the other hand the rest of this more highly volatile component substance is just sufficient for the formation of the equilibrium vapor phase above the melt, so that during the melting operation no liquid or solid phase body of highly volatile component substance will remain in the enclosure. The expression "weighed amounts," as this term is understood in this specification, denotes the quantities by weight of the respective components that are placed into the enclosed system. The term "component substance" is herein used collectively to denote a single component as well as a plurality of components as the case may be; and the term "composition" is understood to comprise alloys and chemical compounds.

The method according to the invention is particularly advantageous for the production of compounds of the type $A_{III}B_V$; that is, of compounds of an element of the third group with an element of the fifth group of the periodic system. This method is also applicable to compounds of the type $A_{II}B_{VI}$; that is, to compounds of an element of the second group with an element of the sixth group of the periodic system, insofar as the components of such $A_{III}B_V$ and $A_{II}B_{VI}$ compounds satisfy the above-mentioned conditions. With binary compounds of the just-mentioned types, the advantages of the invention over the known method are particularly evident if the highly volatile component is arsenic, phosphorus, selenium or sulphur, also when this component is iodine, bromine or mercury.

As example, the method will be described with reference to the production of gallium phosphide (GaP) and with reference to the device schematically illustrated in the drawing.

Used as a sealed enclosure is a quartz ampule 1 which encloses the crucible consisting of a boat 2 of graphite. Placed into the crucible is the less volatile component of the compound or alloy to be formed. The highly volatile component 3 is placed on the bottom of the ampule 1 outside of the boat 2. The middle portion of the ampule can be electrically heated by high-frequency current with the aid of a high-frequency coil 4. The other parts of the ampule can be heated by respective furnace members 5 and 6.

Five grams of the high boiling, that is, less volatile component, namely Ga, are placed into the graphite boat 2. 3.52 grams of the more volatile component, namely phosphorus, regardless of which particular modification is used, are placed at the location 3, or at any other location within the ampule outside of the boat. 2. Thereafter the ampule is fused off and sealed. Then the graphite boat is heated by means of the high-frequency heating coil 4 up to the melting point of GaP, at about 1350° C.; and the remaining portions of the ampule are heated by the furnace members 5 and 6 so that the coldest spot of the ampule has a temperature of at least 650° C. Thereafter the ampule is slowly pulled out of the induction coil 4 in the direction of the indicated arrow so that the melt commences to solidify. The resulting stoichiometric composition, GaP, has consumed, of the original amount of 3.52 grams phosphorus, the quantity of 2.22 grams for the production of the compound, whereas the residual 1.3 grams have served for the formation of the phosphorus component in the equilibrium vapor phase above the melt. With a volume of the ampule of 100 cm.$^3$ and a medium ampule temperature of about 1000° C., a phosphorus vapor pressure of about 8 atmospheres will result in accordance with Van Der Waal's equation. This vapor pressure corresponds to the equilibrium pressure above the molten GaP as required by the method according to the invention.

Assume that a chemist wants to produce a predetermined quantity of a compound $A_mB_n$ in accordance with the method of the present invention. A denotes the high-volatile component, B the low-volatile component, and $m$ and $n$ denote the atom proportions. Then the chemist will at first calculate, from the atomic proportions, the weight proportions of the two components and he will then weight the resulting amounts of the two components into the vessel system to be sealed. He will further increase the amount of the component B by the quantity necessary for forming the equilibrium vapor phase of this component above the melt. As is generally known, this additional quantity is dependent upon the partial vapor pressure of the low-volatile component B adjusting itself above the melt at the processing temperatures to be used, and is also dependent upon the volume of the sealed system. That is, the additional quantity can be calculated from the general gas equation $$N = p \cdot V / R \cdot T$$

In this equation:

$p$ is the equilibrium vapor pressure of the compound at the melting point,
$V$ is the volume of the sealed system,
$R$ is the general gas constant,
$T$ is the median absolute temperature in the system, that is, an approximate average value between the highest and lowest temperature in the system,
$N$ is the required additional quantity of the low-volatile component in moles, relating to the gas molecule of the particular substance.

In all strictness, the Van Der Waal gas equation should be used for the calculation instead of the above-mentioned general gas equation; for most purposes, however, the simpler general gas equation above given is entirely sufficient.

The advantage achieved by this method resides in the fact that this vapor pressure remains relatively constant and is not appreciably sensitive to slight departures from the correct median ampule temperature and ampule volume, and that this pressure can easily be adjusted simply by properly weighing the components, a requirement readily satisfied with extreme accuracy. As mentioned, in the known method where a comparatively large body of the more volatile, that is, the high-volatile component remains available throughout the entire process, the vapor pressure increases exponentially with the minimum temperature of the ampule. In contrast thereto the vapor pressure with the method according to the invention is about proportional to the median absolute ampule temperature. If this temperature, as in the above-mentioned example, is about 1000° C. (i.e. about 1273° K.), then an indeterminacy or variation of the median temperature of ±127° C. results in a variation in vapor pressure of only ±10%. Under the same condition the old method, carried out with a remaining or residual body or melt of the more volatile component, would already result in a change in pressure by the factor two. Furthermore the above-mentioned polymorphy of the phosphorus substance is of no significance in our process because the entire amount of elementary phosphorus available to the melt is present only in the vaporous phase and hence, according to the requirements of the invention, is not present as a body on the bottom of the ampule.

The new method is not only applicable for the production of compounds and alloys from components having the described properties, but is also suitable for the remelting of such compounds or alloys, particularly for melting and oriented solidification (normal freezing), for zone melting or for pulling single crystals. In these cases the method is so conducted that, in addition to the compound or alloy to be remelted, a weighed additional amount of the components of the compounds or alloys is sealed into the enclosure and is given such a composition and quantity that, as a result of the chosen heat supply during remelting, the additionally weighed-in quantities will just result in producing the equilibrium vaporous phase above the melted compound or alloy in the crucible or boat, so that during the remelting of said alloy or compound no body of the added substances will remain in the enclosure.

For instance, if the ampule within which GaP is being remelted has a volume of 100 cm.$^3$, about 1.3 grams phosphorus are additionally placed into the ampule before the ampule is sealed. An addition of a weighed amount of Ga is not required because the Ga portion of the equilibrium vapor phase is negligibly small. Now the ampule is so heated that the coldest spot has a temperature of about 650° C. The weighed-in phosphorus then completely evaporates and forms a phosphorus vapor pressure of about 8 atmospheres which, as mentioned above, corresponds to the equilibrium vapor pressure of phosphorus above the molten GaP. Now the remelting process, for instance a zone melting process, can be carried out in the known manner without the melt becoming decomposed.

According to another modification of the method of our invention, the composition of the melt is intentionally made to depart from the ultimately desired composition of the solidified compound or alloy. This method is predicated upon the fact that the compound or alloy to be produced or remelted will crystallize out of melts of respectively different composition. This is the case, generally, when the concentration region of the particular compound or alloy is very narrow. A special case of this is where there is only one stoichiometric composition.

Under such conditions, it is possible in some cases to operate with pressures which during the melting process are considerably below the equilibrium vapor pressure of the compound or alloy at its melting temperature. To this end, the weighed-in amounts and the temperature program are so chosen that the quantity of the more highly volatile component or components is just sufficient, on the one hand, to form a melt which contains the more highly volatile component substance with a lower concentration than corresponds to the stoichiometric compound or to the predetermined composition of the desired alloy, and on the other hand, to form in the vapor space the predetermined partial vapor pressure of the more highly volatile component substance corresponding to this particular melt, without a body of this component substance remaining in the vessel.

An example of an application as well as the advantages of the last-mentioned modification of our method will be described again with reference to the production of GaP. As mentioned above, the vapor pressure of phosphorus above a melt of GaP in the condition of equilibrium is about 8 atmospheres. This pressure is inconveniently high for technical application. In contrast, a GaP melt that contains only a few percent less P than corresponds to the stoichiometric composition of GaP, has at the liquidus point a vapor pressure of only about 2 atmospheres. In order to permit operating with such a low vapor pressure, the weighed-in amounts are so chosen that a GaP melt results which at the liquidus point has a vapor pressure of about 2 atmospheres. Otherwise the process is carried out in the same manner as in the above-described example. With increasing crystallization of GaP out of the melt, the melt becomes poorer in P. As a result, the partial vapor pressure of P above the melt decreases until the melt commences to take P out of the vapor space. As a consequence, provided the vapor space is given a sufficiently large dimension, the depletion of the melt relative to P is equalized to a large extent and, when the solidification is conducted to be sufficiently slow, almost the entire melt is converted into stoichiometric GaP. Only a relatively small portion of the last solidifying crystal has a second phase, and contains GaP aside from secondarily solidified Ga. This last portion can be cut off and discarded if a stoichiometric compound only is to be obtained.

The method according to the example last described, therefore, combines the advantage of conducting the melting process below the equilibrium vapor pressure of the compound or alloy to be produced, with the advantages resulting from the vanishing of the high-volatile body of solid or liquid substance.

The last-described modification of our method, just like the one described earlier in this specification, may also be employed for the remelting of compounds and alloys whose components satisfy the above-mentioned requirements. Such a remelting process is carried out by placing into the sealed envelope of predetermined dimension an additional, predetermined, and correctly weighed quantity of the components of the compound or alloy, and this addition is given such a composition and amount that, as a result of the proper heating temperature during the remelting process, the melt becomes depleted of the high-volatile component or components and, within the vapor space, the partial vapor pressure of the high-volatile component substance corresponding to this melt will obtain, without a body of this component substance remaining on the bottom of the enclosing vessel. The just-mentioned addition is made in the same manner as described above. That is, the added quantity is placed outside of the crucible proper into the sealed enclosure, aside from the compound or alloy located in the crucible in order to be remelted. The process may also be so conducted that the quantity of the compound or alloy to be remelted and the volume of the sealed enclosure are so adapted to each other, and that the temperature during the remelting process is so chosen, that the melt becomes depleted of the high-volatile component or components to the extent required to produce in the vapor space the predetermined partial pressure that corresponds to this melt, without any body of this component substance being formed on the bottom of the enclosure.

We claim:

1. In a process of manufacturing an $A_{III}B_V$ compound of a more volatile element and a less voatile element having substantially different respective vapor pressures at the melting point of the compound, the vapor pressure of the more volatile element being sufficiently high at said melting point to ordinarily cause a change in the ratio of the elements in the melt because of loss by vaporization of said more volatile element, the improvement which consists in melting a body of the less volatile element and simultaneously vaporizing a body of the more volatile element in separate but communicating zones in a sealed space of predetermined volume and under the autogenous gas pressure developed by said process, the zone of melting being at a higher temperature than the zone of vaporizing and being at least at the melting point but so low as to retain a molten body of the said less volatile element, the quantity of the more volatile element being sufficient for the melt to receive from the gas phase the desired proportion of said element and also only just sufficient to form the gas phase in equilibrium with the melt of said compound, the more volatile element being in contact with the melt only in vapor phase during the process and being entirely in vapor phase at the conclusion of the formation of the compound; and subjecting the melt of said compound in the liquid state obtaining at the conclusion of compound formation to slow and oriented cooling and freezing progressively from one end to the other within the sealed space in said equilibrium gas phase of the more volatile element.

2. A process of making gallium phosphide of the formula GaP, which consists in melting a body of gallium and simultaneously vaporizing a body of phosphorus in separate zones which are in communication with each other in a sealed space under the gas pressure developed by the process, said pressure being dependent upon the median temperature, the gallium zone being maintained at a higher temperature than the zone of the phosphorus body, the amount of the phosphorus being such that at the termination of the gallium phosphide formation no phosphorus body remains in the phosphorous zone so that elemental phosphorus remains only in the vapor phase within the sealed atmosphere, the amount of phosphorus employed being such that, at said termination, there exists a partial pressure of phosphorus vapor which is equal to the pressure of phosphorus vapor in equilibrium with the gallium phosphide melt, the phosphorus being in contact with the melt only in the vapor phase during the process, and subjecting the gallium-phosphide melt in the liquid state obtaining at said termination of said formation to slow and oriented cooling and freezing progressively from one end to the other within the sealed space in the atmosphere of phosphorus vapor.

3. In the process of claim 2, the gallium being heated to about 1350° C., the coldest spot of the sealed space having a temperature of at least 650° C.

4. In a process of manufacturing a binary compound of gallium and a more volatile element selected from the group consisting of phosphorus and arsenic, the improvement which consists in melting a body of gallium and simultaneously vaporizing a body of the more volatile element in separate but communicating zones in a sealed space of predetermined volume and under the autogenous gas pressure developed by said process in said sealed space, the gallium zone being maintained at a higher temperature than the zone of the more volatile element, the amount of said element being such that at the termination of the compound formation no body of said element remains in said space and the more volatile element outside the compound is present only in the vapor phase in the atmosphere sealed in said space, the amount of said element employed being such that, at said termination, there exists a partial vapor pressure of said element which is equal to the pressure of the element vapor in equilibrium with the melt of the compound, the element being in contact with the melt only in the vapor phase during the process, and subjecting the melt of the compound when still in the liquid state to oriented freezing from one end to the other within the sealed space in the vaporous element atmosphere.

References Cited

UNITED STATES PATENTS

| | | |
|---|---|---|
| 2,739,088 | 3/1956 | Pfann. |
| 2,862,787 | 2/1958 | Sequin et al. _____ 23—204 X |
| 2,871,100 | 1/1959 | Guire et al. _____ 23—204 |
| 2,933,384 | 4/1960 | Welker et al. _____ 23—204 X |
| 2,944,975 | 7/1960 | Folberth _____ 23—204 X |

MILTON WEISSMAN, *Primary Examiner.*

OSCAR R. VERTIZ, *Examiner.*